US008244129B2

(12) United States Patent
Kaneko et al.

(10) Patent No.: US 8,244,129 B2
(45) Date of Patent: Aug. 14, 2012

(54) MONITORING APPARATUS AND METHOD FOR POLARIZATION SCRAMBLER AND OPTICAL TRANSMISSION APPARATUS

(75) Inventors: Shinichi Kaneko, Kawasaki (JP); Shinichiro Harasawa, Kawasaki (JP); Kenji Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 12/356,802

(22) Filed: Jan. 21, 2009

(65) Prior Publication Data
US 2009/0290874 A1 Nov. 26, 2009

(30) Foreign Application Priority Data

May 23, 2008 (JP) .................................. 2008-135371

(51) Int. Cl.
*H04J 14/06* (2006.01)
(52) U.S. Cl. ................. 398/65; 398/33; 398/43; 398/93
(58) Field of Classification Search .................... 398/33, 398/43, 65
See application file for complete search history.

(56) References Cited

U.S. PATENT DOCUMENTS 8,032,022 B2 * 10/2011 Zhou et al. ....................... 398/32
2003/0039427 A1 * 2/2003 Yamaguchi .................... 385/11

FOREIGN PATENT DOCUMENTS

| JP | 09-018422 | 1/1997 |
| JP | 10-285144 | 10/1998 |
| JP | 2003-60576 | 2/2003 |
| JP | 2003-298511 | 10/2003 |
| JP | 2004-112427 | 4/2004 |
| JP | 2004-289751 | 10/2004 |
| JP | 2005-347941 | 12/2005 |
| JP | 2008-085612 | 4/2008 |

OTHER PUBLICATIONS

Japanese Office Action mailed Apr. 10, 2012 for corresponding Japanese Application No. 2008-135371, with English-language translation.

* cited by examiner

*Primary Examiner* — Dung Nguyen
(74) *Attorney, Agent, or Firm* — Fujitsu Patent Center

(57) ABSTRACT

There are provided a polarized light passing device to pass therethrough specific polarized light, of output light of a polarization scrambler; and a detecting unit to detect a modulation component according to a frequency of a polarization control signal from the light which passes through the polarized light passing device.

12 Claims, 11 Drawing Sheets

MONITORING APPARATUS AND METHOD FOR POLARIZATION SCRAMBLER AND OPTICAL TRANSMISSION APPARATUS

CROSS-REFERENCE TO RELATED APPLICATION(S)

This application is based upon and claims the benefit of priority of the prior Japanese Application No. 2008-135371 filed on May 23, 2008 in Japan, the entire contents of which are hereby incorporated by reference.

FIELD

The embodiment(s) discussed herein is directed to a monitoring apparatus and a method for a polarization scrambler and an optical transmission apparatus. For example, the embodiment (s) may be employed in an optical transmission apparatus including a polarization scrambler.

BACKGROUND

Recently, wavelengths expansion (upgrade) in optical transmission systems such as existing submarine cables is performed as a means for increasing the transmission amount to respond to increase in communications amount. In a case where the number of wavelengths is increased in, for example, one-wavelength optical transmission system or a wavelength division multiplexing (WDM) system with a narrowband, wavelengths can be multiplexed in a high density with the wavelength intervals (grids) set to be narrow in a predetermined signal band. Further, error correction schemes and encoding schemes with improved characteristics can be demanded.

On an occasion of transmission of signal light through an optical transmission path under a poor optical signal to noise ratio (OSNR) state, significant effects from the polarization of signal light are caused, and changes in the signal light level and characteristics deterioration can be caused by polarization hole burning or the like. To reduce such effects as deterioration of signal quality due to the polarization dependency, a polarization scrambler that randomizes the polarization state of signal light can be used.

[Patent Document 1] Japanese Laid-open Patent Publication No. 2003-60576

SUMMARY

For example, exemplary embodiment(s) uses the following.

(1) According to an exemplary embodiment, there is provided a monitoring apparatus for a polarization scrambler which scrambles a state of polarization of input light in accordance with a polarization control signal, the monitoring apparatus including: a polarized light passing device to pass therethrough specific polarized light, of output light of the polarization scrambler; and a detecting unit to detect a modulation component according to a frequency of the polarization control signal from the light which passes through the polarized light passing device.

(2) According to an exemplary embodiment, there is provided an optical transmission apparatus, including: a polarization scrambler to scramble a state of polarization of input light; a polarization control unit to control the scrambling by providing a polarization control signal to the polarization scrambler; a polarized light passing device to pass therethrough specific polarized light, of output light of the polarization scrambler; and a detecting unit to detect a modulation component according to a frequency of the polarization control signal from the light which passes through the polarized light passing device.

(3) As still another generic feature, there provided is a method for monitoring a polarization scrambler which scrambles a state of polarization of input light in accordance with a polarization control signal, the method comprising: passing specific polarized light, of output light of the polarization scrambler, through a polarized light passing device; and detecting a modulation component according to a frequency of the polarization control signal from the light which passes through the polarized light passing device.

Additional objects and advantages of the invention (embodiments) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

[1] First Embodiment

Figure 1:
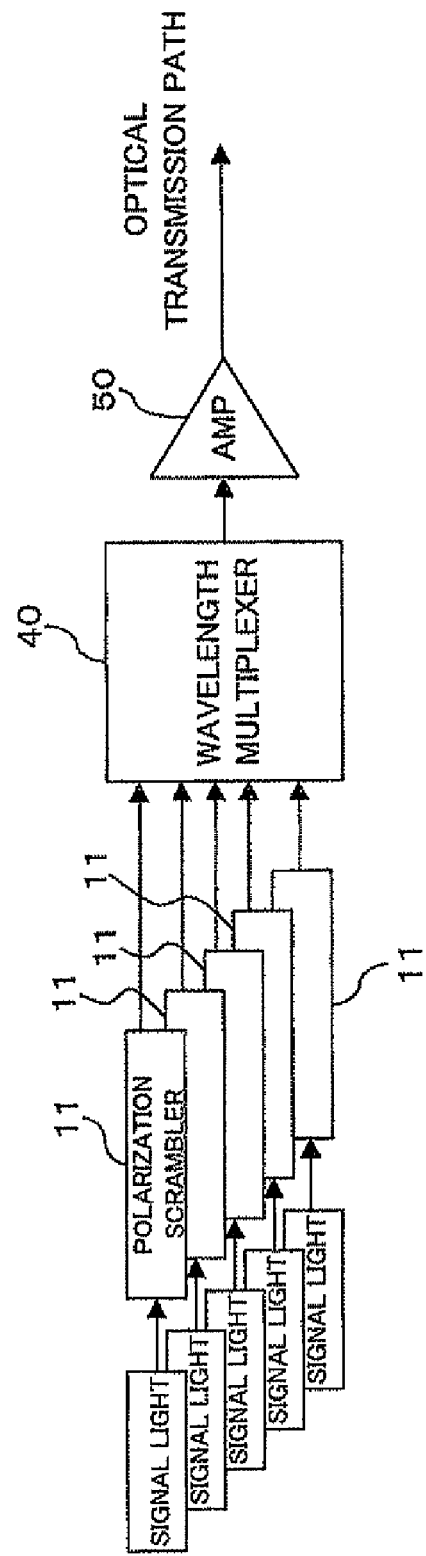
FIG. 1 is a block diagram illustrating an example of a construction of a transmission system of a WDM optical transmission apparatus.
Figure 2:
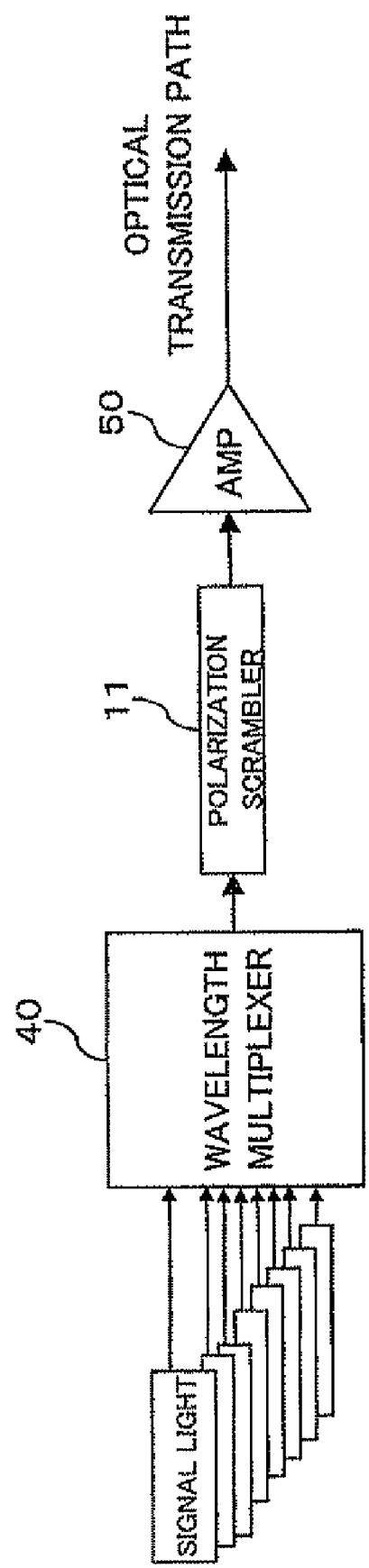
FIG. 2 is a block diagram illustrating another example of a construction of a transmission system of a WDM optical transmission apparatus.

For performing polarization scrambling of transmission signal light in a WDM optical transmission apparatus, the following techniques are used. For example, as illustrated in FIG. 1, the polarization scrambler 11 implements polarization scrambling for each wavelength before wavelength multiplexing is performed by the wavelength multiplexer 40. Further, as illustrated in FIG. 2, a polarization scrambler 11, common to WDM signals after being subjected wavelength multiplexing performed by the wavelength multiplexer 40, collectively implements polarization scrambling to the WDM signals. In this instance, in FIG. 1 and FIG. 2, reference character 50 indicates an optical amplifier, such as an EDFA, which collectively amplifies a WDM signal.

Figure 3:
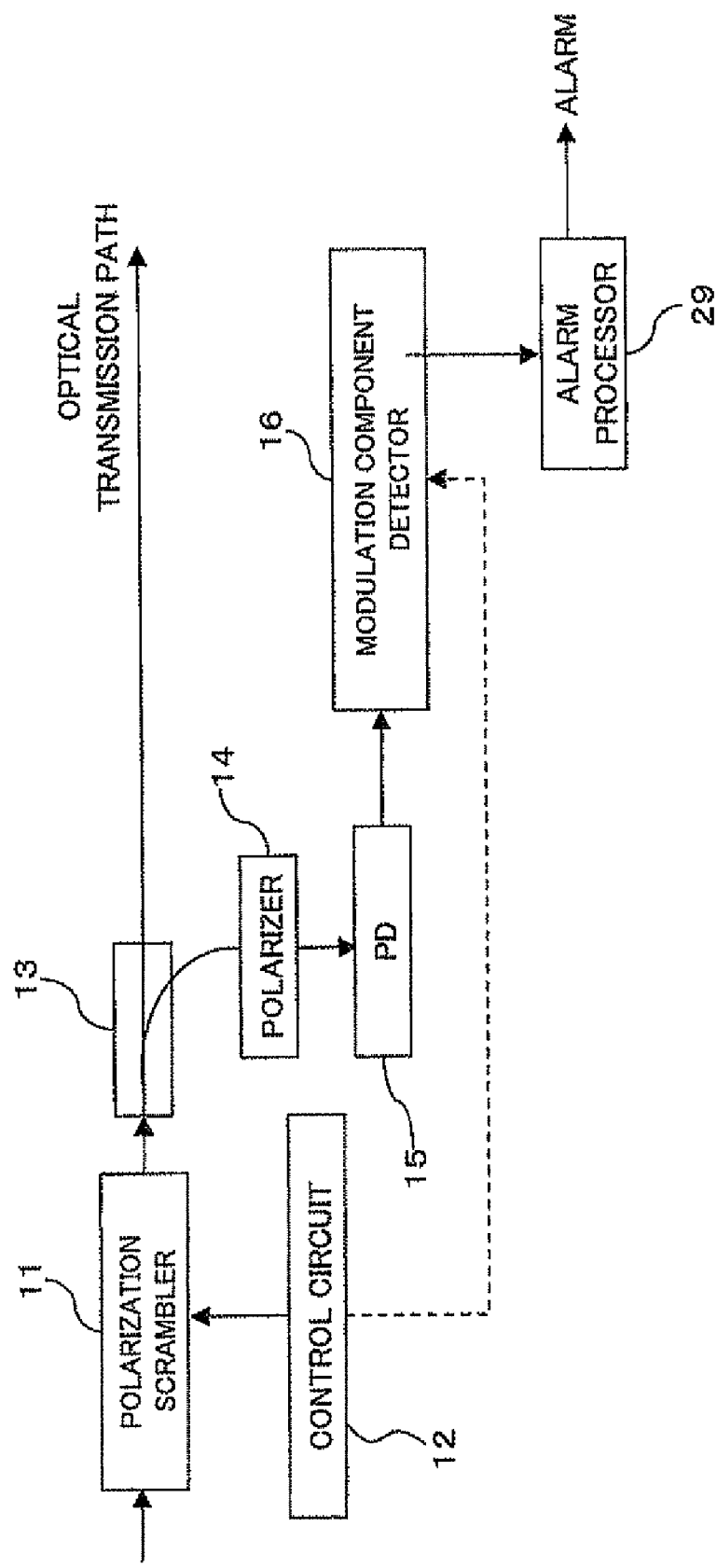
FIG. 3 is a block diagram illustrating an example of a monitoring apparatus of a polarization scrambler according to a first embodiment.

FIG. 3 illustrates an example of a construction for monitoring the polarization scrambler 11 for one wavelength in the WDM optical transmission apparatus illustrated in FIG. 1. The WDM optical transmission apparatus illustrated in FIG. 3 includes, for example: a polarization scrambler 11; a control circuit (polarization controller) 12; an optical coupler (splitter coupler) 13; a polarizer 14; a photo diode (PD) 15, which is given as an example of a photo detector; a modulation component detector 16; and an alarm processor (evaluating unit) 29. The optical coupler 13, the polarizer 14, the PD 15, the modulation component detector 16, and the alarm processor 29 form an example of a monitoring apparatus of the polarization scrambler 11.

The polarization scrambler (polarization modulator) 11 scrambles (modulates or randomizes) the polarization (polarization of light) of input light. As examples of such a polarization scrambler 11, the following can be applicable: the one that utilizes an electro-optic effect of, for example, lithium niobate (LiNb03); the one that utilizes a birefringence rate change caused by addition of external forces, such as pressure, vibration, temperature, and a magnetic field, at a level which causes no loss.

Here, the state of polarization of light can be expressed by the Stokes parameters S0 (the intensity of polarization), S1 (the intensity of the horizontal linear polarization scrambler component), S2 (the intensity of the 45° linear polarization component), and S3 (the intensity of the right-handed circular polarized light). For example, the degree of polarization (DOP) is capable of being defined by the following formula (1) by using the above mentioned Stokes parameters, S0, S1, S2, and S3.

$$DOP = \frac{(S1^2 + S2^2 + S3^2)^{1/2}}{S0} [\%] \quad (1)$$

In a case of complete polarization, that is, when the degree of polarization (DOP)=1, the formula of $(S0)^{1/2}=(S1)^{1/2}+(S2)^{1/2}+(S3)^{1/2}$ is held.

Therefore, the Stokes parameters S1, S2, and S3, which indicate a state of polarization, positions at one point over a spherical surface of a sphere with the radius of the intensity S0. With an attention paid to a state of polarization, the state of polarization of light of the intensity unit (S0=1) is capable of being indicated with the position over the unit spherical surface with S1, S2, and S3 as three axes of the system of rectangular coordinates. Such a sphere is called "Poincare sphere".

The control circuit 12 gives the polarization scrambler 11 a control such that the Poincare sphere makes one rotation at constant cycles for preventing the polarization condition expressed over this Poincare sphere from being impartial, thereby making it possible to make the DOP close to 0% (a non-polarized state).

For example, the above mentioned control is performed to make the state of polarization of the light signal change at a speed sufficiently higher than the operation speed (response frequency) of the optical amplifier 50, thereby making the DOP close to 0% (a non-polarized state). As a result, it becomes possible to reduce signal quality deterioration caused by the polarization dependence of the gain of the optical amplifier 50, the polarization dependence of the transmission loss in the optical transmission path, the deterioration of signal quality due to polarization hole burning, or the like. In this instance, in the present example, the frequency (modulation frequency) of the above mentioned polarization control signal of the control circuit 12 is assumed to be a few hundred kHz, for example, 100 kHz.

The splitter coupler 13 splits a part of the light having been subjected to polarization scrambling performed by the polarization scrambler 11, and then inputs the split part of the light to the polarizer 14. The remaining light is sent to the optical transmission path.

The polarizer (polarized light passing device) 14 passes therethrough polarized light in a specific direction among the split light inputted by the splitter coupler 13. Thus, in a case where an appropriate scrambling of the polarization of input light is not performed, the light whose polarized light agrees with the polarization surface of the polarizer passes through the polarizer 14 in a direct-current (DC) manner, and the light with the other polarized waves does not pass through the polarizer 14. In this instance, such a polarizer 14 is merely an example of a polarized light passing device which the light polarized in a specific direction passes through, and the polarize light passing device should by no means be limited to this (the same goes for in the following descriptions).

On the other hand, in a case where an appropriate scrambling of the polarization of the input light is performed, the above mentioned input light evenly contains light in an arbitrary state of polarization. Thus, light in a specific state of polarization cyclically passes through the polarizer 14 in accordance with changed in the polarization due to the polarization scrambler 11. That is, in a case where the polarization scrambler 11 appropriately operates, the polarizer 14 outputs the light having a frequency component (modulation component) according to the polarization control signal (modulation frequency: for example, 600 kHz) given to the polarization scrambler 11 by the control circuit 12, in other words, the modulated light.

Accordingly, monitoring the output light of the polarizer 14 makes it possible to evaluate whether or not the polarization scrambler 11 is in an appropriate operation. For example, with a modulation component measured (detected) when the polarization scrambler 11 is in an appropriate operation as a reference, if a modulation component that falls within a predetermined permissive range with respect to the reference, it is possible to determine that the polarization scrambler 11 is in an appropriate operation.

In contrast to this, if a modulation component outside the above mentioned permissive range is detected, or if the modulation component itself is not detected, it is possible to determine that the polarization scrambler 11 is not in an appropriate operation (an occurrence of any abnormality or deterioration of its ability). When it is determined that the polarization scrambler 11 is not in an appropriate operation, it is possible for the alarm processor 29 to generate an alarm or to record a log.

Hence, according to the present example, the output light of the polarizer 14 is monitored by the PD 15 and the modulation component detector 16. That is, the PD 15 generates an electric signal in accordance with the intensity of reception of the light having passed through the polarizer 14 as the monitor value of the output light of the polarization scrambler 11, and the modulation component detector 16 detects the above mentioned modulation component from the monitoring value obtained by this PD 15.

Figure 4:
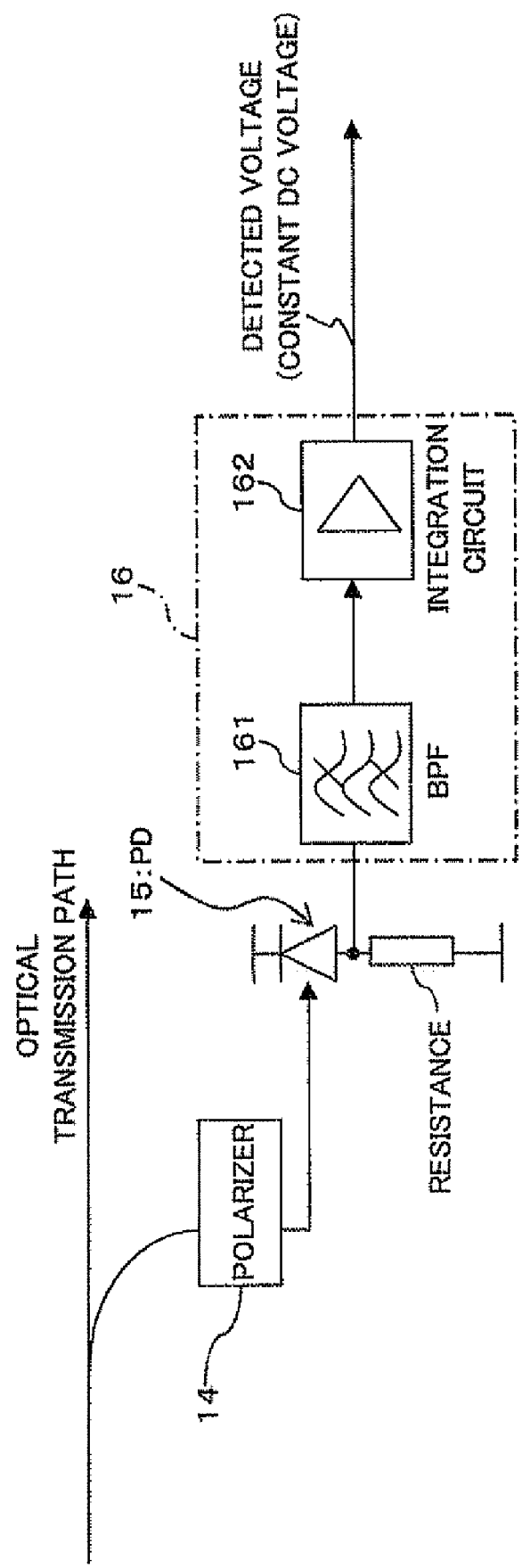
FIG. 4 is a block diagram illustrating an example of a construction of the modification component detector (modification component detecting unit) exemplified in FIG. 3.

FIG. 4 illustrates an example of a construction of the modulation component detector 16. The modulation component detector 16 depicted in FIG. 4 includes, for example, a bandpass filter (BPF) 161 and an integration circuit 162.

The BPF 161 passes therethrough a signal component in a predetermined band with the above mentioned modulation frequency as the center thereof, out of the frequency components contained in the electric signal obtained by the PD 15 in accordance with the output light power of the polarizer 14.

The integration circuit 162 integrates (averages) the signal having passed through the BPF 161. This makes it possible to obtain a constant direct current (DC) voltage as the detection voltage (average value) of the modulation component.

Figure 5:
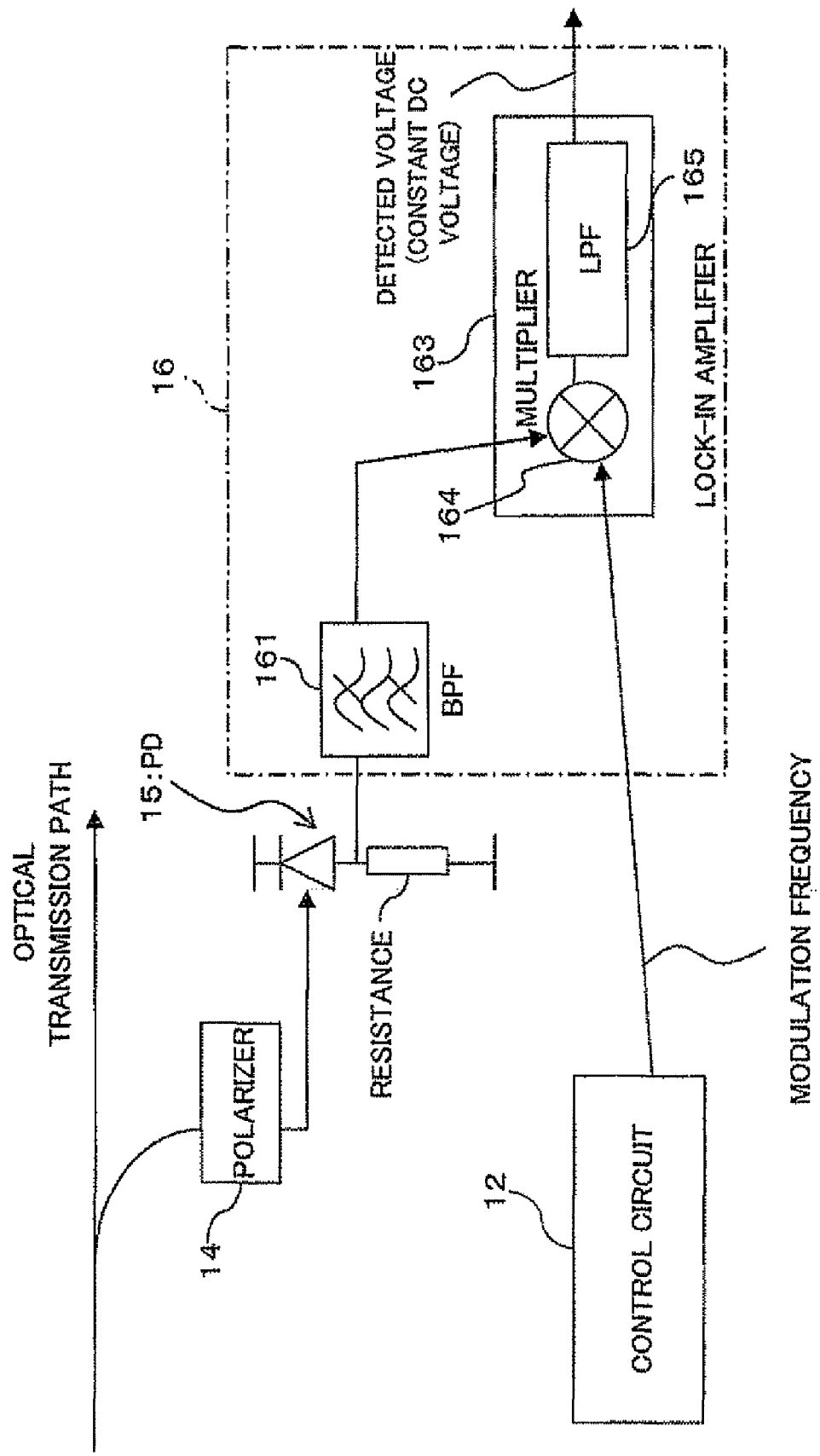
FIG. 5 is a block diagram illustrating another example of a construction of the modification component detector exemplified in FIG. 3.

In this instance, to improve the accuracy of detection of the modulation component, the modulation component detector 16 can have the construction exemplified in FIG. 5. The modulation component detector 16 depicted in FIG. 5 includes, for example, a BPF 161; and a lock-in amplifier 163 having a multiplier 164 and a lowpass filter (LPF) 165.

Similar to that illustrated in FIG. 4, the BPF 161 passes therethrough a signal component in a predetermined band with the modulation frequency as the center thereof, out of the frequency components contained in an electric signal obtained by the PD 15 in accordance with the output light power of the polarizer 14.

The lock-in amplifier 163 detects a signal having the same frequency component as that of a reference signal from the input signal that is a subject of measurement. Then, the input signal is made to be a signal passing through the BPF 161, and the above mentioned reference signal is made to be a signal (see, for example, the dotted arrow in FIG. 3) at the above mentioned modulation frequency (for example, the oscillation frequency of a local oscillator which is omitted from the illustration thereof) given by the control circuit 12. This makes it possible to detect the above mentioned modulation component from the output of the BPF 161.

More precisely, the multiplier 164 multiples the output signal of the BPF 161 and the signal at the above mentioned frequency together, thereby converting the component equal to the modulation frequency, which is a reference signal, out of the output signal of the BPF 161, into a direct current. At that time, the other frequency components are converted into alternating current signals.

The LPF 165 passes therethrough a low-frequency signal (direct current signal) containing the above mentioned modulation frequency, out of the output signal of the multiplier 164. Thus, it is possible only for the modulation component converted by the multiplier 164 into a direct current signal to pass the LPF 165, and the other frequency components having been converted in an alternating current signal is removed. As a result, as the output of the LPF 165, a constant direct current (DC) voltage is obtained as a detection voltage (average value) of the modulation component.

The lock-in amplifier 163 does not given a large effect to the measurement result as long as it is capable of passing the direct current signal even when a cut-off frequency of the LPF 165 is deviated in same degree. Further, in comparison with a BPF, a narrow-band LPF can be easily realized. Accordingly, by using a lock-in amplifier 163 as in the present example, it becomes easy to improve the accuracy of detection of the modulation component.

In this instance, the lock-in amplifier 163 is capable of employing a phase sensitive detector (PSD) made by a switch element, in place of the multiplier 164.

Figure 6:
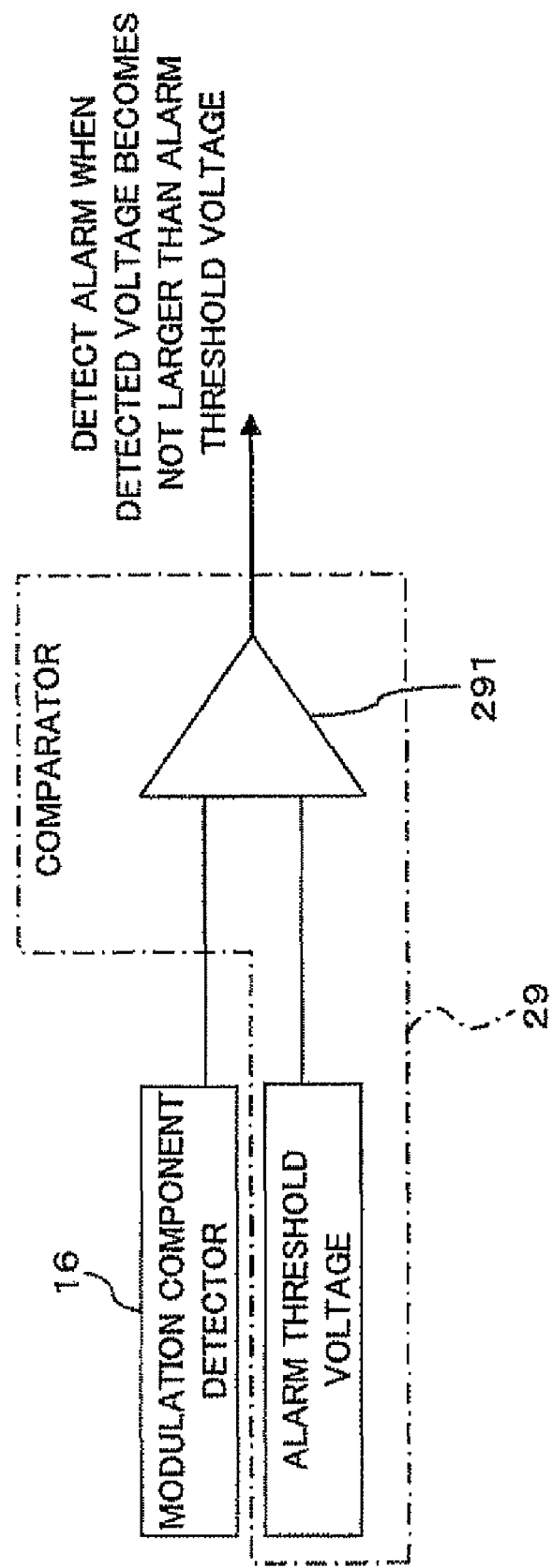
FIG. 6 is a diagram illustrating an example of a construction of the alarm processor (alarm processing unit) exemplified in FIG. 3.

As illustrated in FIG. 6, for example, the alarm processor 29 has a comparator 291. This comparator 291 compares the detection result (a constant DC voltage) obtained by the modulation component detector 16 with a predetermined alarm threshold voltage. If the result of the comparison exhibits the detection result equal to or lower the above mentioned alarm threshold voltage, it is decided that the polarization scrambler 11 is not in an appropriate operation, and the comparator 291, for example, outputs an alarm signal, which can be notified to, for example, an operator of the optical transmission apparatus. Further, it is also possible to record the log of occurrences of alarms.

In a case where the deterioration of the performance of the polarization scrambler 11 makes it impossible to sufficiently change (scramble) the polarization, it can happen that the signal quality is abruptly deteriorated, and it can also happen that the performance deterioration does not lead to the deterioration of signal quality immediately. For this reason, it is not easy to detect the performance deterioration of the polarization scrambler 11 from an error state of light signals or the like. Accordingly, it is difficult to evaluate whether the reason for signal quality deterioration lies in the polarization scrambler 11 or in the abnormality of other equipment.

However, according to the present example, a simple construction makes it possible to evaluate whether or not the polarization scrambler 11 is in an appropriate operation, so that it is easy to monitor the characteristics (performance deterioration or the like) of the polarization scrambler 11, and it is also easy to distinguish the cause of the signal quality deterioration. Further, it is unnecessary to provide an expensive measurement apparatus for monitoring the state of polarization.

[2] Second Embodiment

Figure 7:
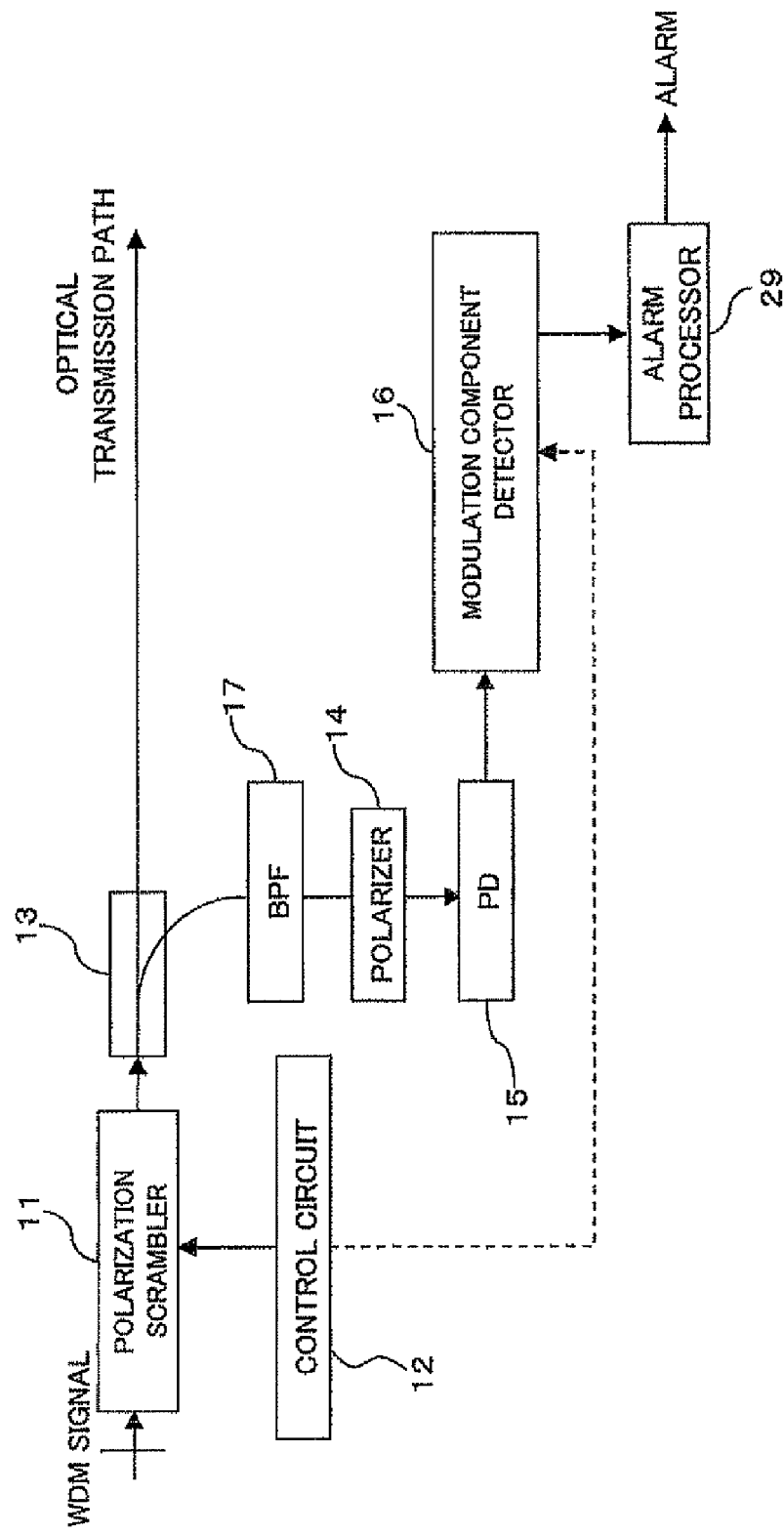
FIG. 7 is a block diagram illustrating an example of a monitoring apparatus of a polarization scrambler according to a second embodiment.

FIG. 7 is a block diagram illustrating an example of a WDM optical transmission apparatus according to a second embodiment. FIG. 7 illustrates an example of a construction in which the polarization scrambler 11 that performs polarization scrambling of all the WDM light exemplified in FIG. 2 in a collective manner.

For example, this WDM optical transmission apparatus illustrated in FIG. 7 differs from the constructions depicted in FIG. 3 through FIG. 6 in that the input light to the polarization scrambler 11 is WDM light and in that an optical band-pass filter (BPF) 17 is provided between the splitter coupler 13 and the polarizer 14. In this instance, in FIG. 4, the elements added thereto with reference characters the same as those already described are the elements the same as or similar to those already described unless otherwise described. In the present example, the splitter coupler 13, the BPF 17, the polarizer 14, the PD 15, the modulation component detector 16, and the alarm processor 29 form an example of a monitoring apparatus of the polarization scrambler 11.

The polarization scrambler 11 receives a WDM signal from the wavelength multiplexer 40 depicted in FIG. 2 as an input, and performs collective polarization scrambling to the WDM signal under control from the control circuit 12.

The BPF 17 passes therethrough a light signal at any of the wavelengths (channels), of the output (WDM signal) of the polarization scrambler 11. The wavelength of the signal passing through the BPF 17 can be fixed or variable.

With this arrangement, it becomes possible for the polarizer 14, the PD 15, and the modulation component detector 16 to detect the presence or the absence of the modulation component according to the modulation frequency given by the control circuit 12 to the polarization scrambler 11, for any of the wavelengths contained in the WDM signal output from the polarization scrambler 11.

Therefore, according to the present example, it becomes possible to easily monitor the state of polarization scrambling of WDM light whose monitoring is difficult by use of an expensive measurement device that monitors the state of polarization.

[3] Third Embodiment

Figure 8:
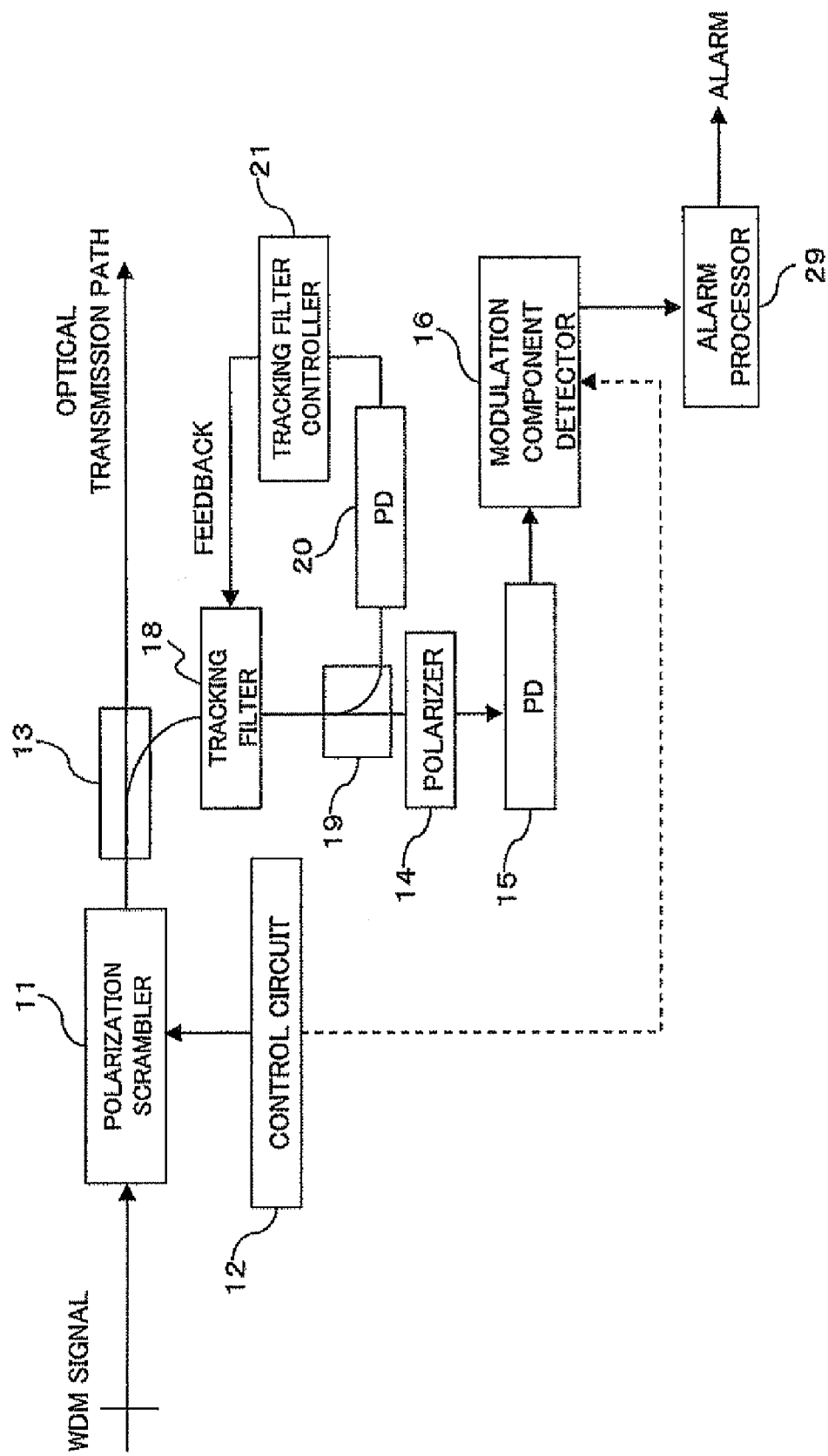
FIG. 8 is a block diagram illustrating an example of a monitoring apparatus of a polarization scrambler according to a third embodiment.

FIG. 8 is a block diagram illustrating an example of a WDM optical transmission apparatus according to a third embodiment. This FIG. 8 also illustrates an example of a construction in which the polarization scrambler 11 that performs polarization scrambling of all the WDM light exemplified in FIG. 2 in a collective manner.

For example, this WDM optical transmission apparatus illustrated in FIG. 8 differs from the constructions depicted in FIG. 3 through FIG. 6 in that input light to the polarization scrambler 11 is a WDM signal, and in that a tracing filter 18 and an optical coupler (splitting coupler) 19 are provided between the splitter coupler 13 and the polarizer 14 together with a optical receiver (PD: photo diode) 20 and a tracking filter controller 21.

In this instance, in FIG. 8, the elements added thereto with reference characters the same as those already described are the elements the same as or similar to those already described unless otherwise described. In this example, the optical coupler 13, the tracking filter 18, the optical coupler 19, the PD 20, the tracking filter controller 21, the polarizer 14, the PD 15, the modulation component detector 16, and the alarm processor 29 form an example of a monitoring apparatus of the polarization scrambler 11.

The polarization scrambler 11 receives a WDM signal from the wavelength multiplexer 40 depicted in FIG. 2 as an input, and performs polarization scrambling collectively to the WDM signal under control from the control circuit 12.

Further, the tracking filter 18, which is a wavelength tunable filter, is capable of being set a wavelength (monitor wavelength) passing through the filter to any of the wavelengths (channels) contained in the WDM signal in accordance with the setting (controlling) from the tracking filter controller 21.

The splitting coupler 19 branches the light signal having passed through the tracking filter 18; one is then output to the PD 20; the other is then output to the polarizer 14.

The PD 20 generates an electric signal according to the photoreception intensity of the light signal input from the splitting coupler 19, and then outputs the thus generated electric signal to the tracking filter controller 21.

The tracking filter control unit (wavelength filter control unit) 21 controls the wavelength (monitor wavelength) passing through the tracking filter 18. For example, in a case where the level of the electric signal generated by the PD 20 is lower than a predetermined threshold value, the tracking filter controller 21 decides that the light at the wavelength passing through the tracking filter 18 does not have a light intensity enough to detect the modulation component, already described, in the modulation component detector 16, and sets the wavelength passing through the tracking filter 18 to another wavelength.

With this arrangement, in the WDM transmission apparatus according to the present example, in a case where a photoreception intensity enough to detect the modulation component cannot be obtained, the cannel (monitoring channel) that is a subject of detection (monitoring) is capable of being adaptively switched to another channel.

As a result, even in a state where light of a part of the channels of a WDM signal is missing or the light intensity thereof is not sufficient, it is possible monitor the characteristics of the polarization scrambler 11 with reliability.

In this instance, the tracking filter controller 21 is also capable of changing the wavelength passing the tracking filter 18, that is, a monitor channel, at arbitrary timing. It is also possible to change the wavelength (monitoring channel) cyclically passing through the tracking filter 18 in obedience to predetermined rules such as polling.

[4] Fourth Embodiment

Figure 9:
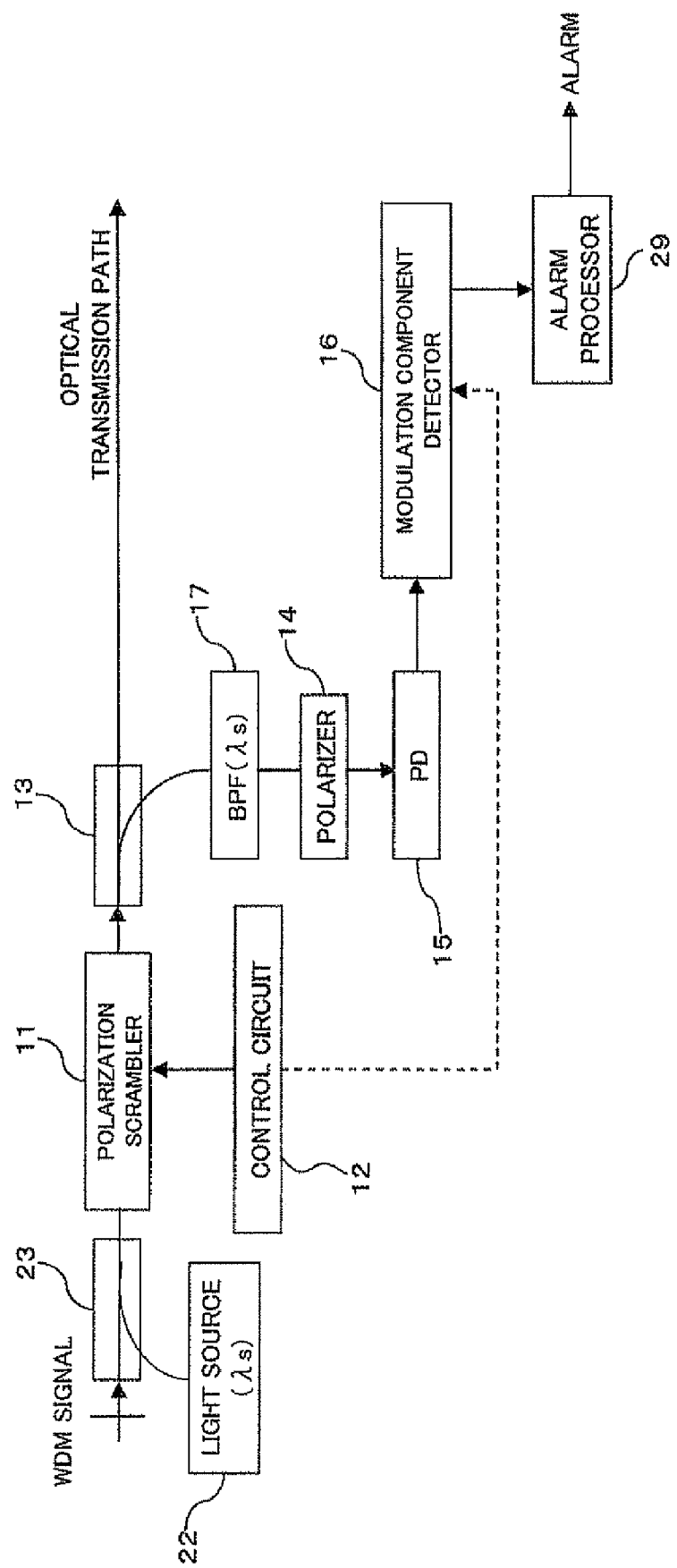
FIG. 9 is a block diagram illustrating an example of a monitoring apparatus of a polarization scrambler according to a fourth embodiment.

FIG. 9 is a block diagram illustrating an example of a WDM optical transmission apparatus according to a fourth embodiment. FIG. 9 illustrates an example of a construction in which the polarization scrambler 11 that performs polarization scrambling of all the WDM light exemplified in FIG. 2 in a collective manner.

For example, the WDM optical transmission apparatus illustrated in FIG. 9 differs from the constructions depicted in FIG. 3 through FIG. 6 in that a light source 22 for outputting light at a frequency of $\lambda s$ and an optical coupler (combiner coupler) 23 at the input end of the polarization scrambler 11 together with the band-pass filter BPF 17 provided between the splitter coupler 13 and the polarizer 14.

In this instance, in FIG. 9, the elements added thereto with reference characters the same as those already described are the elements the same as or similar to those already described unless otherwise described. In the present example, the light source 22, the optical coupler 23, the optical coupler 13, the BPF 17, the polarizer 14, the PD 15, the modulation component detector 16, and the alarm processor 29 form an example of a monitoring apparatus of the polarization scrambler 11.

For example, the light source 22 generates light at a wavelength (channel) ($\lambda s$) other than the wavelengths (channels) contained in the WDM signal input to the polarization scrambler 11. A light emitting device, such as a laser diode, is capable of being employed as the light source 22. The amount of light emitted by this light source 22 is sufficient to be smaller than the light emission amount of the light source used for generating signal light. Thus, the life of the light source 22 is capable of being lengthened in comparison with other light sources for emitting signal light, so that the reliability of the light source 22 is improved.

The combiner coupler 23 combines the WDM signal, which is transmission signal light, with the direct current light from the light source 22, and then inputs the thus obtained combined light to the polarization scrambler 11.

The polarization scrambler 11 performs collective polarization scrambling to the WDM light input from the optical coupler 23 under control by the control circuit 12.

The WDM light after being subjected to the polarization scrambling is bifurcated by the splitter coupler 13: one is sent to the BPF 17; the other is sent to the optical transmission path.

The BPF 17, which has a pass band characteristic to pass therethrough the light at an emission wavelength of $\lambda s$, pass therethrough the light at a wavelength of $\lambda s$, out of the WDM light input from the splitter coupler 13.

The light having passes through the BPF 17 is input to the polarizer 14. This makes it possible for the polarizer 14, the PD 15, and the modulation component detector 16 to evaluate whether or not the light at a wavelength of λs of the monitoring channel contains a modulation component in accordance with the control (modulation frequency) performed by the control circuit 12.

As described above, according to the present example, light at a wavelength (monitoring channel) of λs with high reliability is wavelength-division multiplexed to the WDM light, and it is then evaluated whether or not the light at a wavelength of λs, of the output light from the polarization scrambler 11, is modulated in accordance with the control performed by the control circuit 12. This makes it possible to monitor the characteristics of the polarization scrambler 11. Accordingly, in comparison with the embodiments already described, it is possible to perform characteristic monitoring of the polarization scrambler 11 in a stable manner for a long time.

Further, even when signal light of a part of wavelengths (channels) of the WDM light is missing, since it is unnecessary to change the monitoring channel different from the WDM light channel, it is possible to avoid troubles such as resetting monitoring channels every when increase or decrease in wavelength is performed.

[5] Fifth Embodiment

Figure 10:
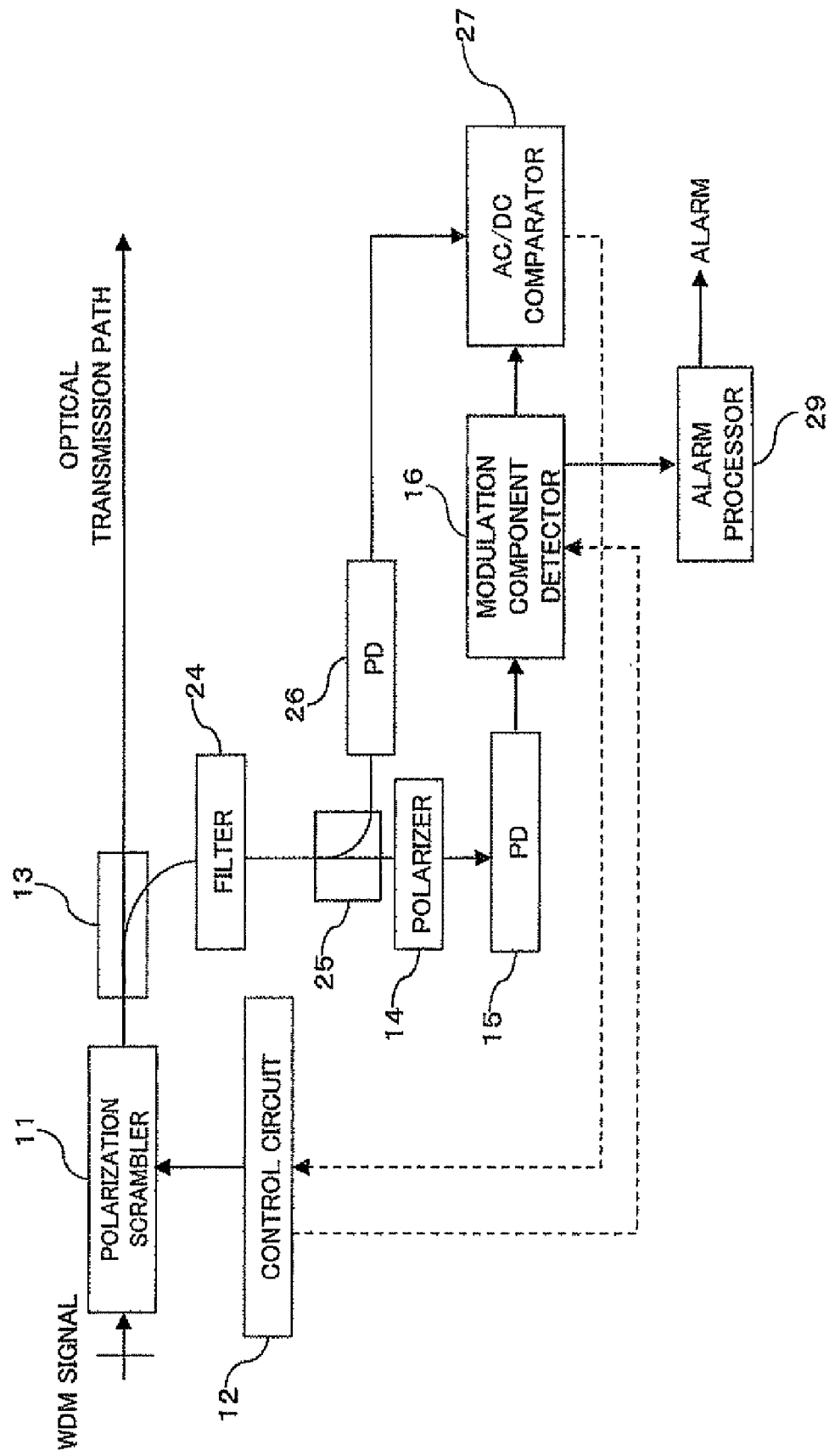
FIG. 10 is a block diagram illustrating an example of a monitoring apparatus of a polarization scrambler according to a fifth embodiment.

FIG. 10 is a block diagram illustrating an example of a WDM optical transmission apparatus according to a fifth embodiment. FIG. 10 illustrates an example of a construction in which the polarization scrambler 11 that performs polarization scrambling of all the WDM light exemplified in FIG. 2 in a collective manner.

For example, this WDM optical transmission apparatus illustrated in FIG. 10 differs from the constructions depicted in FIG. 3 through FIG. 6 in that input light to the polarization scrambler 11 is a WDM signal, and in that the filter 24 and the optical coupler (splitter coupler) 25 are provided between the splitter coupler 13 and the polarizer 14, and in that the photoreceptor (PD) 26 and the AC/DC comparator 27 are provided.

In this instance, in FIG. 10, also, the elements added thereto with reference characters the same as those already described are the elements the same as or similar to those already described unless otherwise described. In this example, the optical coupler 13, the filter 24, the optical coupler 25, the PD 26, the polarizer 14, the PD 15, the modulation component detector 16, the AC/DC comparator 27, and the alarm processor 29 forms an example of a monitoring apparatus of the polarization scrambler 11.

The polarization scrambler 11 performs polarization scrambling collectively to the input WDM signal under control from the control circuit 12.

The WDM light after being subjected to the polarization scrambling is bifurcated by the splitter coupler 13: one is sent to the filter 24; the other is sent to the optical transmission path.

The filter 24 has a pass wavelength characteristic that passes the light at any of the wavelengths contained in the WDM light through the filter 24, which is, for example, a BPF which passes therethrough a wavelength that is fixed or variable.

The optical coupler 25 bifurcates the light signal having passed through the filter 24, one is then output to the polarizer 14; the other is then output to the PD 26.

The PD 26 generates an electric signal according to the intensity (DC component) of the bifurcated light from the optical coupler 25, that is, the intensity of the light having passed through the filter 24 before passing through the polarizer 14, as a monitoring value. That monitoring value is input to the AC/DC comparator 27.

On the other hand, the polarizer 14, the PD 15, and the modulation component detector 16 detects the presence or the absence of the modulation component as to the light having passed through the filter 24. The thus obtained detection result [a modulation component (AC component) having passed through the polarizer 14] is input to the AC/DC comparator 27.

The AC/DC comparator 27 compares the DC component from the PD 26 with an AC component from the modulation component detector 16, thereby detecting the modulation degree of the polarization scrambler 11, and the thus obtained detection information is fedback to the polarization scrambler 11.

Normally, the DOP of the polarization scrambler 11 depends on voltage applied to the polarization scrambler 11 even in a case of a type that utilizes an LN modulator or a type that applies pressure to an optical fiber.

Hence, it is possible to realize stable control for making the DOP constant by means of performing feedback to the control circuit 12 of the polarization scrambler 11 in such a manner that the ratio (AC/DC) of the above mentioned AC component to the above mentioned DC component becomes constant.

That is, the AC/DC comparator 27 according to the present example is used as an example of an adjusting unit for adjusting a control signal given by the control circuit 12 to the polarization scrambler 11 in such a manner that the ratio of the direct current component of the output light of the polarization scrambler 11 to the above mentioned modulation component, which is an alternating current component, becomes constant.

[6] Sixth Embodiment

Figure 11:
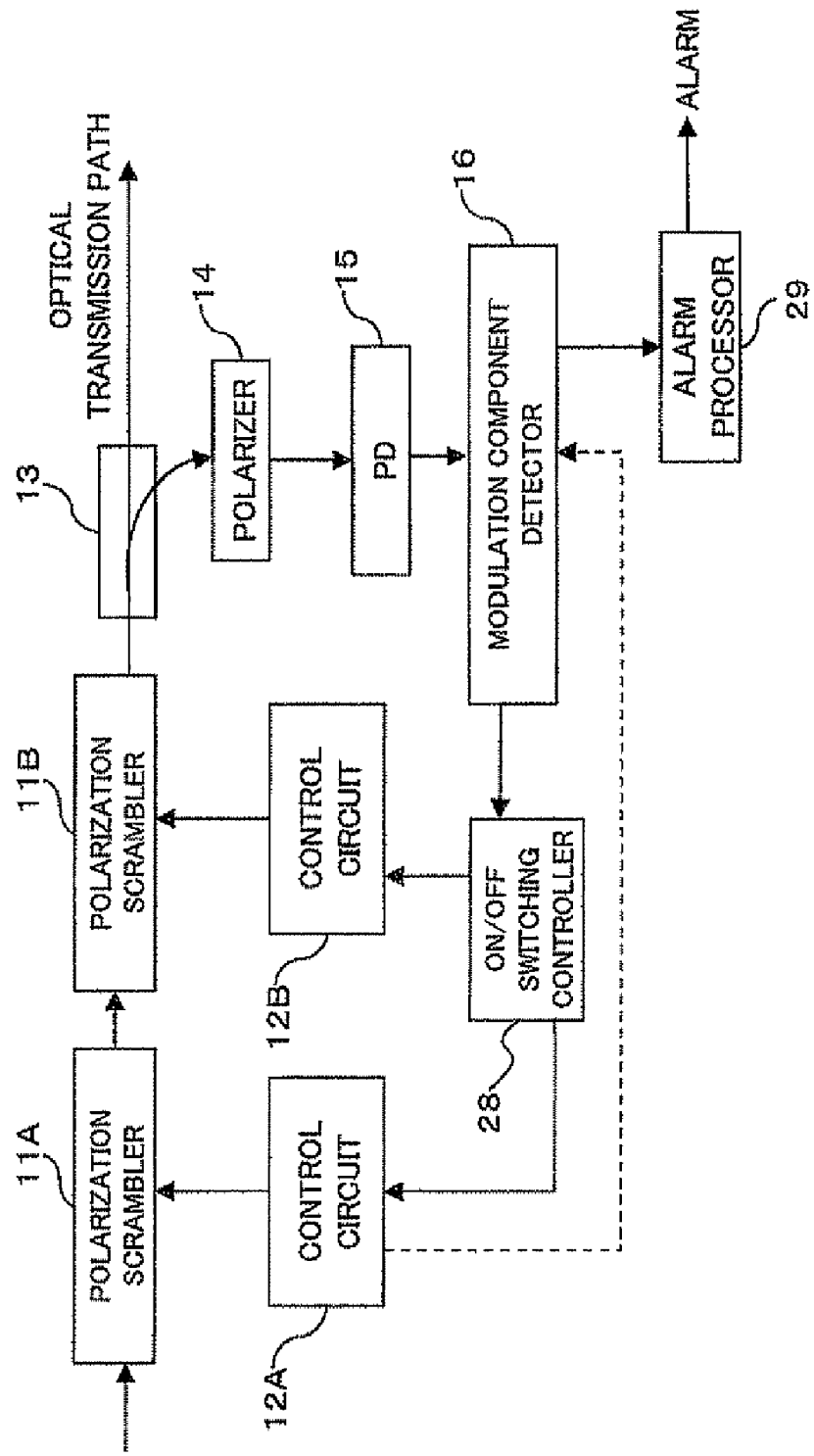
FIG. 11 is a block diagram illustrating an example of a monitoring apparatus of a polarization scrambler according to a sixth embodiment.

FIG. 11 illustrates a block diagram illustrating an example of a WDM optical transmission apparatus according to a sixth embodiment. This FIG. 11 illustrates an example of a construction for monitoring the polarization controller for one wavelength depicted in FIG. 1.

The WDM optical transmission apparatus illustrated in FIG. 11 includes, for example: polarization scramblers 11A and 11B coupled with each other in series; control circuits 12A and 12B for these polarization scramblers 11A and 11B, respectively; an optical coupler (splitter coupler) 13; a polarizer 14; a photoreceptor (PD) 15; a modulation component detector 16; and an ON/OFF switching controller 28. According to the present example, the optical coupler 13, the polarizer 14, the PD 15, the modulation component detector 16, the ON/OFF switching controller 28, and the alarm processor 29 form an example of a monitoring apparatus of the polarization scrambler 11.

The polarization scramblers 11A and 11B (hereinafter, will be referred to as the "polarization scrambler 11" in a case where no distinction is made therebetween), each of which is the same as or similar to the polarization scrambler 11 already described, scramble the polarization of the input light under control of the corresponding control circuits 12A and 12B. In this instance, as the polarization scramblers 11A and 11B, the ones of the same type (LN type, pressure type, or the like) can be applicable, and the ones of different types can also be applied.

Each of the control circuits (polarization controllers) 12A and 12B is the same as or similar to the control circuit 12 already described. For example, control equivalent to having the Poincare sphere make one rotation at constant cycles for preventing the polarization condition expressed over this Poincare sphere from being impartial, is performed to the corresponding polarization scramblers 11A and 11B. This makes it possible to make the DOP of the input light close to 0% (a non-polarized condition).

According to the present example, also, the control circuits 12A and 12B each are subjected to the above mentioned controlling in such a manner that, for example, the state of polarization of the light signal changes at a speed (frequency) sufficiently higher than the operation speed (response frequency) of the optical amplifier 50. This makes it possible to make the DOP close to 0% (the average state of polarization). Similar to the embodiments already described, the above described frequency at that time can be a few hundred kHz, for example, 100 kHz.

In this instance, the control circuits 12A and 12B can be control circuits common to the polarization scramblers 11A and 11B.

The ON/OFF switching controller 28 performs control such that either one of the control circuits 12A and 12B is made into an operation (ON) state, and the other is made into a non-operation (OFF) state.

For example, it is assumed that, in a case where the control circuit 12A is in a state of ON and also the control circuit 12B is in a state of OFF, the modulation component detector 16 does not detect an appropriate one of the modulation components (the detection result obtained by the detecting unit is equal to or lower than a predetermined threshold). In this case, the ON/OFF switching controller 28 makes the control circuit 12A into a state of OFF and the control circuit 12B, a state of ON, thereby switching the polarization scrambler under an operation condition thereof to another polarization scrambler 11B.

In this instance, a detection operation of the modulation component by the polarizer 14, the PD 15, and the modulation component detector 16, is the same as that in the embodiment already described.

Generally speaking, the scrambling functions of the polarization scramblers 11A and 11B are realized by using a passive component such as an optical fiber, so that the signal light never falls in a break condition even when disorders or performance deterioration occur in either of the polarization scramblers 11A and 11B coupled to each other in series.

Accordingly, as described above, multiple polarization scramblers 11 are coupled to each other in series, thereby realizing the redundancy therein. When the modulation component detector 16 does not detect an appropriate one of the modulation components, the polarization scrambler 11 in a state of ON is controlled to be in a state of OFF, and also, any one of the other polarization scramblers 11 being in a state of OFF is controlled to be in a state of ON. As a result, switching becomes available to a polarization scrambler 11 that realizes an appropriate operation thereof, without halting an operation of the WDM optical transmission apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A monitoring apparatus for a polarization scrambler which scrambles a state of polarization of input light in accordance with a polarization control signal, the monitoring apparatus comprising:
    a polarizer to pass therethrough light having a predetermined direction of polarization, of output light of the polarization scrambler; and
    a detector to detect a modulation component according to a frequency of the polarization control signal from the light which passes through the polarizer.

2. The monitoring apparatus for a polarization scrambler as set forth in claim 1, the monitoring apparatus further comprising:
    an alarm processor to evaluate that the polarization scrambler is wrong in a case where a detection result obtained by the detector is equal to or lower than a predetermined threshold value.

3. The monitoring apparatus for a polarization scrambler as set forth in claim 1, wherein the input light is wavelength multiplexed light in which light at a plurality of wavelengths is multiplexed,
    the monitoring apparatus further comprising: a wavelength filter to pass therethrough light at any of the plurality of wavelengths, of the output light of the polarization scrambler, to input the light that passes through the wavelength filter to the polarizer.

4. The monitoring apparatus for a polarization scrambler as set forth in claim 2, wherein the input light is wavelength multiplexed light in which light at a plurality of wavelengths is multiplexed,
    the monitoring apparatus further comprising: a wavelength filter to pass therethrough light at any of the plurality of wavelengths, of the output light of the polarization scrambler, to input the light that passes through the wavelength filter to the polarizer.

5. The monitoring apparatus for a polarization scrambler as set forth in claim 3, wherein the wavelength filter is a tunable filter to pass therethrough variable wavelengths,
    the monitoring apparatus further comprising: a wavelength filter controller to change the wavelength of the light passing the tunable filter in a case where the detection result obtained by the detector is equal to or lower than the predetermined threshold.

6. The monitoring apparatus for a polarization scrambler as set forth in claim 4, wherein the wavelength filter is a tunable filter to pass therethrough variable wavelengths,
    the monitoring apparatus further comprising: a wavelength filter controller to change the wavelength of the light passing the tunable filter in a case where the detection result obtained by the detector is equal to or lower than a predetermined threshold.

7. The monitoring apparatus for a polarization scrambler as set forth in claim 1, the monitoring apparatus further comprising:
    a light source to generate light at a monitor wavelength different from the wavelength of the input light;
    a wavelength multiplexer to perform wavelength multiplexing of the light generated by the light source to the input light; and
    a wavelength filter to pass therethrough the light at the monitor wavelength, of the output light of the polarization scrambler, to input the light at the monitor wavelength to the polarizer.

8. The monitoring apparatus for a polarization scrambler as set forth in claim 2, the monitoring apparatus further comprising:
    a light source to generate light at a monitor wavelength different from the wavelength of the input light;
    a wavelength multiplexer to perform wavelength multiplexing of the light generated by the light source to the input light; and a wavelength filter to pass therethrough the light at the monitor wavelength, of the output light of the polarization scrambler, to input the light at the monitor wavelength to the polarizer.

9. The monitoring apparatus for a polarization scrambler as set forth in claim 1, the monitoring apparatus further comprising:
an integration circuit to adjust the polarization control signal in such a manner that a ratio of a direct current component of the output light of the polarization scrambler to the modulation component, which is an alternating current component, is constant.

10. The monitoring apparatus for a polarization scrambler as set forth in claim 1, wherein a plurality of said polarization scramblers are coupled in series,
the monitoring apparatus further comprising: a switching controller to switch a polarization scrambler under an operating condition thereof to another polarization scrambler in a case where the detection result obtained by the detector is equal to or lower than a predetermined threshold value.

11. An optical transmission apparatus, comprising:
a polarization scrambler to scramble a state of polarization of input light;
a polarization control circuit control the scrambling by providing a polarization control signal to the polarization scrambler;
a splitter to split a part of output light of the polarization scrambler;
a polarizer to pass therethrough light having a predetermined direction of polarization, of output light of the splitter; and
a detector to detect a modulation component according to a frequency of the polarization control signal from the light which passes through the polarizer.

12. A method for monitoring a polarization scrambler which scrambles a state of polarization of input light in accordance with a polarization control signal, the method comprising:
passing light having a predetermined direction of polarization, of output light of the polarization scrambler, through a polarizer; and
detecting a modulation component according to a frequency of the polarization control signal from the light which passes through the polarizer.

* * * * *